(12) United States Patent
Urano et al.

(10) Patent No.: US 7,920,218 B2
(45) Date of Patent: Apr. 5, 2011

(54) RECORDING DEVICE

(75) Inventors: Chisato Urano, Ebina (JP); Takashi Morikawa, Ebina (JP); Haruo Harada, Ebina (JP); Yasunori Okano, Tokyo (JP); Taijyu Gan, Ebina (JP); Atsushi Hirano, Ebina (JP); Hiroshi Arisawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 84 days.

(21) Appl. No.: 12/509,727

(22) Filed: Jul. 27, 2009

(65) Prior Publication Data
US 2010/0225838 A1 Sep. 9, 2010

(30) Foreign Application Priority Data
Mar. 5, 2009 (JP) .................. 2009-052570

(51) Int. Cl.
*G02F 1/133* (2006.01)
(52) U.S. Cl. .................. 349/36; 349/2; 349/19; 349/24; 349/25; 349/33
(58) Field of Classification Search .................. 349/1, 2, 349/19, 24, 25, 33, 36
See application file for complete search history.

(56) References Cited

U.S. PATENT DOCUMENTS
6,580,481 B2 * 6/2003 Ueda et al. ............... 349/115
6,773,626 B2 * 8/2004 Sanada et al. ........... 252/299.01

FOREIGN PATENT DOCUMENTS
JP A-7-225369 8/1995
JP A-2000-111942 4/2000
JP A-2004-198949 7/2004

* cited by examiner

*Primary Examiner* — Jennifer Doan
(74) *Attorney, Agent, or Firm* — Oliff & Berridge, PLC

(57) ABSTRACT

A recording device that includes an obtainment unit that obtains image information representing an image; and a voltage application unit that applies a voltage with a frequency according to the image information obtained by the obtainment unit, to a pair of electrodes equipped with a display medium, the display medium having a multi-layered liquid-crystal phase provided between the pair of electrodes, the multi-layered liquid-crystal phase having a first layer capable of assuming a specific alignment when the applied voltage is greater than or equal to a pre-set first voltage threshold, and a second layer capable of assuming a specific alignment when the applied voltage is greater than or equal to a second voltage threshold. An application of a voltage to the pair of electrodes effecting a first voltage component and a second voltage component applied to the first layer and the second layer, respectively.

5 Claims, 4 Drawing Sheets

P:PLANAR ALIGNMENT  F:FOCAL CONIC ALIGNMENT
H:HOMEOTROPIC ALIGNMENT

P:PLANAR ALIGNMENT  F:FOCAL CONIC ALIGNMENT

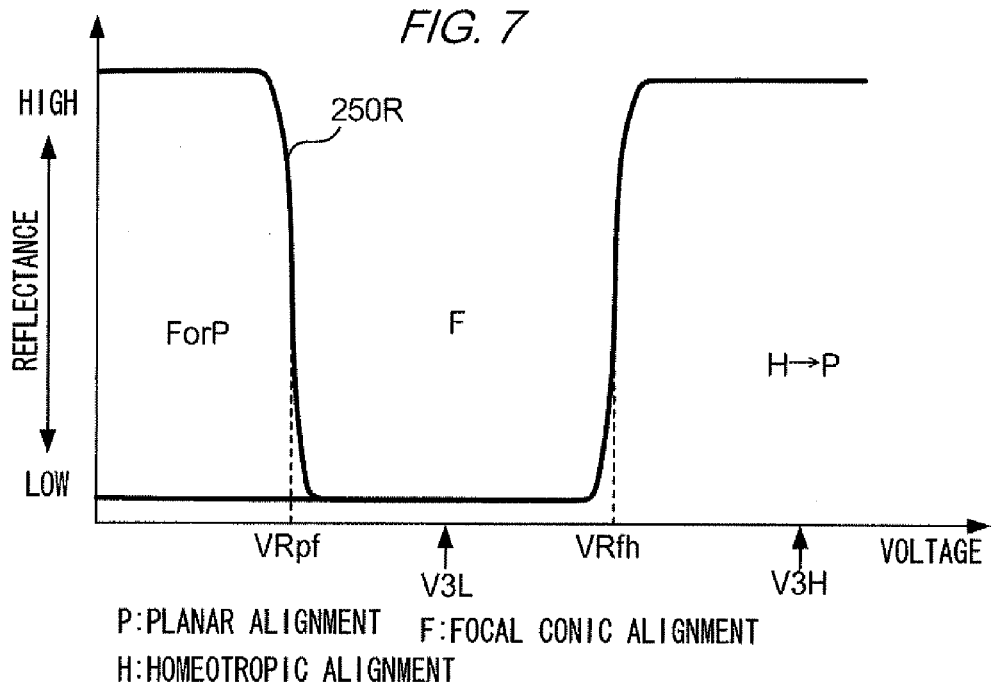
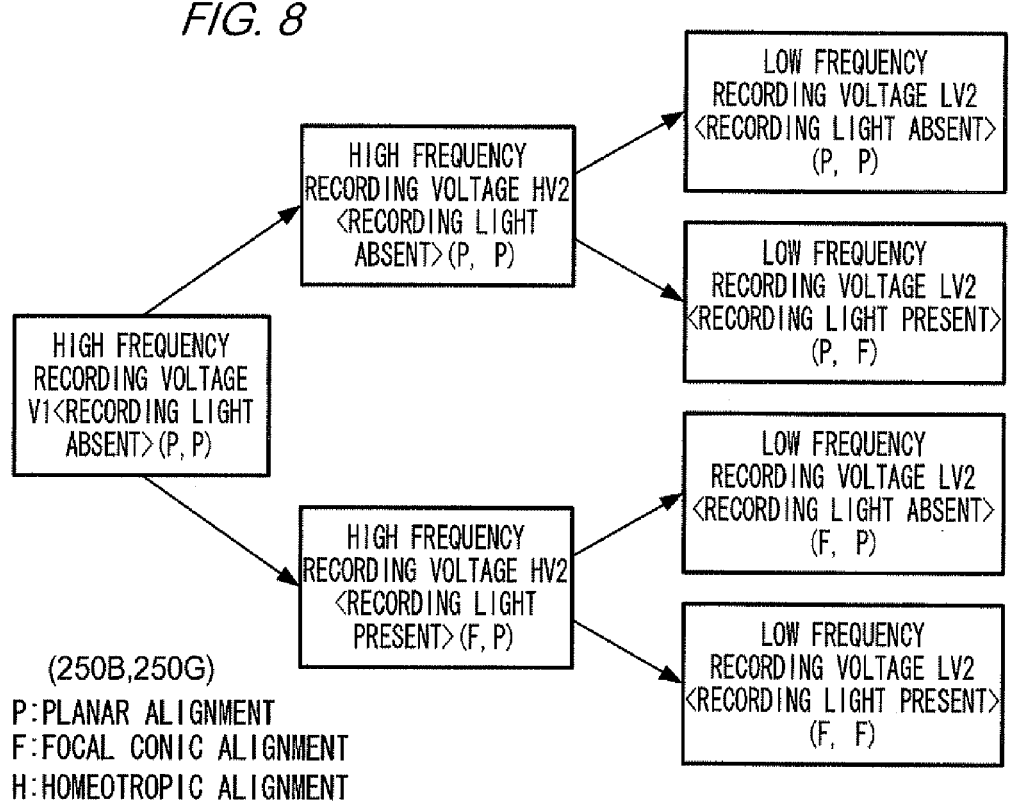

(54) RECORDING DEVICE

CROSS-REFERENCE TO RELATED APPLICATIONS

This application is based on and claims priority under 35 USC 119 from Japanese Patent Application No. 2009-052570 filed Mar. 5, 2009.

BACKGROUND

1. Technical Field

The present invention relates to a recording device.

2. Related Art

Among techniques for recording images by irradiating an optical recording-type display medium with light, a display medium capable of color display has been disclosed, the medium having a display layer in which multiple liquid-crystal layers are stacked between a pair of electrodes, and the display being realized by applying different threshold voltages to change the alignment of each of the liquid-crystal layers.

SUMMARY

The present invention provides a recording device that includes an obtainment unit that obtains image information representing an image; and a voltage application unit that applies a voltage with a frequency according to the image information obtained by the obtainment unit, to a pair of electrodes equipped with a display medium, the display medium having a multi-layered liquid-crystal phase provided between the pair of electrodes, the multi-layered liquid-crystal phase having a first layer capable of assuming a specific alignment when the applied voltage is greater than or equal to a pre-set first voltage threshold, and a second layer capable of assuming a specific alignment when the applied voltage is greater than or equal to a second voltage threshold. An application of a voltage to the pair of electrodes effecting a first voltage component and a second voltage component applied to the first layer and the second layer, respectively; when the voltage applied to the pair of electrodes is of a first frequency and is a pre-set voltage value, the first voltage component becomes greater than or equal to the first voltage threshold, and the second voltage component becomes less than the second voltage threshold; and when the voltage applied to the pair of electrodes is of a second frequency that is lower than the first frequency and is a pre-set voltage value, the first voltage component becomes less than the first voltage threshold, and the second voltage component becomes greater than or equal to the second voltage threshold.

BRIEF DESCRIPTION OF THE DRAWINGS

An exemplary embodiment of the present invention shall be described in detail based on the following figures, wherein:

FIG. 7 is a diagram illustrating an example of the reflectance properties of a liquid-crystal layer 250R; and FIG. 8 is a diagram illustrating change in the alignments of the liquid-crystal layers 250B and 250G.

DETAILED DESCRIPTION

An exemplary embodiment of the present invention shall now be described.

1. Exemplary Embodiment

Figure 1:
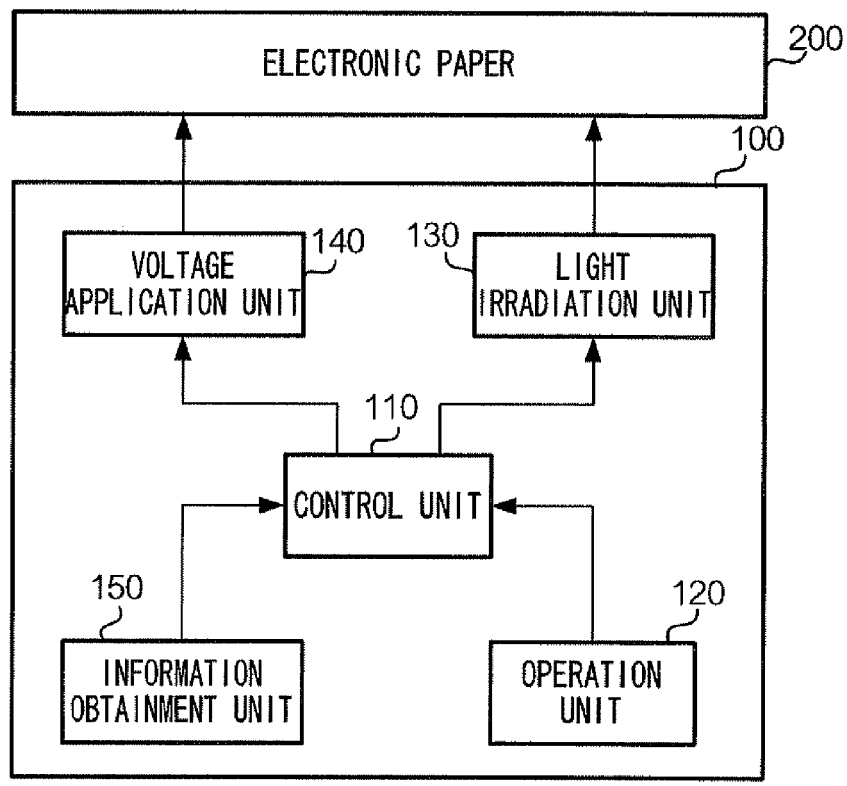
FIG. 1 is a block diagram illustrating the configuration of a recording device according to an exemplary embodiment.

FIG. 1 is a block diagram illustrating the configuration of a recording device 100 according to an exemplary embodiment. The recording device 100 is a device that records an image, based on image information, onto electronic paper 200 held in the recording device 100. The recording device 100 is provided with a control unit 110, an operation unit 120, a light irradiation unit 130, a voltage application unit 140, and an information obtainment unit 150.

The control unit 110 includes a processing device such as a CPU (Central Processing Unit), a storage device such as a memory or the like, and so on, and controls the operations of the various elements within the recording device 100. The operation unit 120 is an operational device such as a touch panel, a keyboard, or the like that performs operations through which a user executes instructions for selecting, confirming, canceling, and so on in the recording device 100, and outputs information indicating the details of those operations to the control unit 110.

The light irradiation unit 130 has a light source that irradiates light when recording an image onto the electronic paper 200. This light source is a semiconductor laser or the like, and the light emitted therefrom is reflected off of a reflector such as a rotating polygon mirror, thereby irradiating the units at which the image on the electronic paper 200 is displayed, or pixels, with a spot-shaped light. The irradiation of the light irradiation unit 130 is controlled by the control unit 110 so that the spot-shaped light scans the electronic paper 200. Note that this light source may also be an LED array in which multiple LEDs (Light-Emitting Diodes) are disposed in a linear fashion and lenses that condense the light from the multiple LEDs are provided in a range based on the resolution of the image to be recorded; alternatively, the light source may be a planar light source. In this example, the recording light emitted from the light irradiation unit 130 uses light of a wavelength corresponding to red or blue colors, and changes the floor of the emitted light under the control of the control unit 110.

The voltage application unit 140 includes electrodes, and applies a recording voltage to the electronic paper 200 via the electrodes under the control of the control unit 110. When the voltage application unit 140 emits a recording voltage while the electronic paper 200 is being held by the recording device 100, that recording voltage is applied between transparent electrodes 220 and 260 or transparent electrodes 222 and 262, which shall be described later. Between which electrodes the recording voltage is applied is determined based on control performed by the control unit 110. Furthermore, the voltage applied by the voltage application unit 140 is controlled so that its frequency and voltage value change according to a state that is configured in advance by the control unit 110, and this change is controlled so as to be synchronized with the irradiation of the recording light by the light irradiation unit 130.

The information obtainment unit 150 obtains various information, such as a control program, image information representing images, and so on from a storage device or external device (not shown). In this example, the function for obtaining information from an external device is implemented using a wired or wireless communication unit. Note that the unit that obtains the various information from the external device is not limited to the communication unit, and may instead be an interface that obtains the information from a semiconductor memory such as a USB memory or a memory card, or from an optical disk such as a CD or a DVD. This ends the descriptions of the configuration of the recording device 100.

Figure 2:
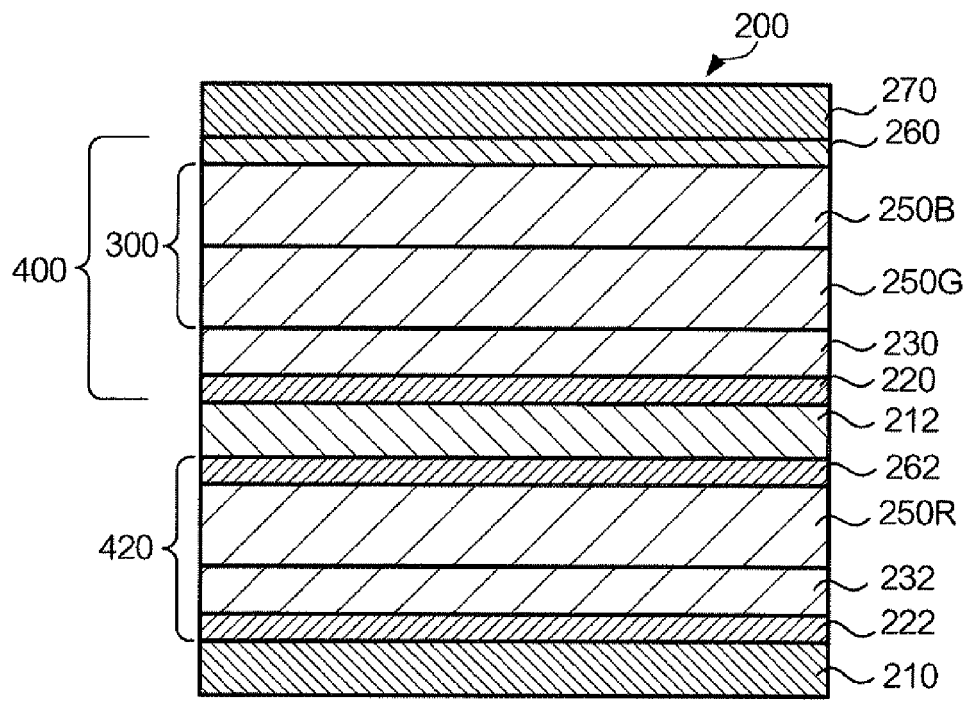
FIG. 2 is a diagram illustrating the configuration of electronic paper according to an exemplary embodiment.

FIG. 2 is a diagram illustrating the configuration of the electronic paper 200, which is the optical-recording type display medium according to an exemplary embodiment of the present invention. The electronic paper 200 is an optical-recording type display medium that displays an image recorded in accordance with recording light irradiated when a pre-set recording voltage is applied thereto, and has a first display layer 400 sandwiched between film substrates 270 and 212 and a second display layer 420 sandwiched between film substrates 212 and 210. The first display layer 400 includes the transparent electrodes 220 and 260, a photoconductive layer 230, and a multi-layered liquid-crystal phase 300 (including liquid-crystal layers 250B and 250G). The second display layer 420 includes the transparent electrodes 222 and 262, a photoconductive layer 232, and a liquid-crystal layer 250R.

The film substrates 210, 212, and 270 are layers provided to protect the surface and maintain the shape of the electronic paper 200, and are, for example, polyethylene terephthalate (PET). The film substrate 270 is provided on the side from which the user views the recorded image.

The transparent electrodes 220, 222, 260, and 262 are layers that include indium tin oxide (ITO). The transparent electrodes 220, 222, 260, and 262 are connected to electrodes (not shown). These electrodes are connected to the electrodes of the voltage application unit 140 when the electronic paper 200 is being held by the recording device 100. When a voltage is applied by the voltage application unit 140 via the electrodes in this state, the voltage is applied, as mentioned above, between the transparent electrodes 220 and 260 or between the transparent electrodes 222 and 262.

The photoconductive layers 230 and 232 are photosensitive layers having electric conductors that experience differing conductivities when irradiated with the recording light and a photocharge arises as a result of the irradiation, and, for example, organic photoconductors is used as the photoconductive layers 230 and 232. The photoconductive layer 230 is, in the present example, configured to absorb blue and green light but let red light pass through, using blue and green charge production matter. On the other hand, the photoconductive layer 232 is configured to absorb red light but let blue and green light pass through, using red charge production matter.

Upon absorbing recording light, the resistance value of the photoconductive layers 230 and 232 drops in the areas where the light was absorbed. Therefore, when a voltage is applied between the transparent electrodes 220 and 260 by the voltage application unit 140, the voltage is divided between the photoconductive layer 230 and the multi-layered liquid-crystal phase 300, but when the resistance value of the photoconductive layer 230 drops, the ratio of the voltage applied to the multi-layered liquid-crystal phase 300 increases, whereas the ratio of the voltage applied to the photoconductive layer 230 drops. Meanwhile, when a voltage is applied between the transparent electrodes 222 and 262 by the voltage application unit 140, the voltage is divided between the photoconductive layer 232 and the liquid-crystal layer 250R, but when the resistance value of the photoconductive layer 232 drops, the ratio of the voltage applied to the liquid-crystal layer 250R increases, whereas the ratio of the voltage applied to the photoconductive layer 232 drops.

The liquid-crystal layers 250B, 250G, and 250R include elements that alter the state in which they reflect light by changing their alignment based on the voltage applied thereto, which are cholesteric liquid-crystal elements (called "liquid-crystals" hereinafter) in microcapsule form dispersed throughout a binder resin. The liquid-crystals can assume planar and focal conic alignments when voltage is not applied. Liquid-crystals reflect light and show a predetermined color when in the planar alignment, and allow light to pass through when in the focal conic alignment. In this example, the liquid-crystal layers 250B, 250G, and 250R have liquid-crystals adjusted with materials that reflect blue, green, and red, respectively, and in the planar alignment, selectively reflect light of differing wavelength distributions for blue, green, and red, respectively, with respect to incident light. Control of these alignments shall be discussed later.

Figure 3:
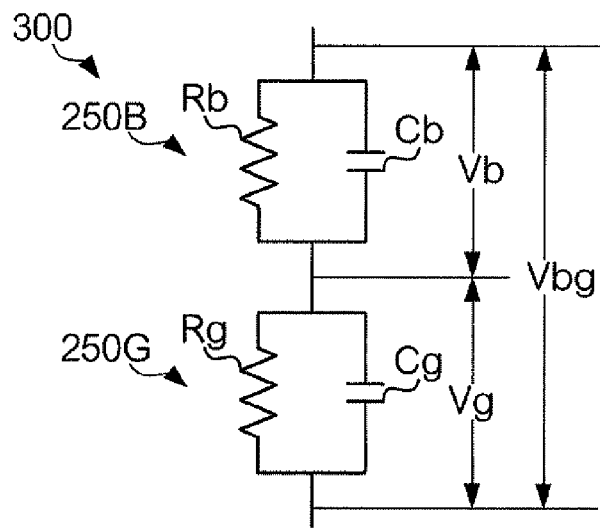
FIG. 3 is a diagram illustrating an example of an analogous circuit of a multi-layered liquid-crystal phase.

FIG. 3 is a diagram illustrating an example of an analogous circuit of the multi-layered liquid-crystal phase 300. The multi-layered liquid-crystal phase 300 shall be described using FIG. 3. A voltage Vg shown in FIG. 3 is the voltage that is divided and supplied to the first display layer 400 when the recording voltage is applied to the transparent electrodes 220 and 260 by the voltage application unit 140. Voltages Vb and Vg are voltages applied to the liquid-crystal layers 250B and 250G, respectively, when the voltage Vbg is divided between the liquid-crystal layers 250B and 250G.

In the analogous circuit for the liquid-crystal layer 250B, a resistor Rb and a capacitor Cb are connected in parallel, and in the analogous circuit for the liquid-crystal layer 250G, a resistor Rg and a capacitor Cg are connected in parallel.

Because, for example, the liquid-crystal layer 250B contains a cyano-based material, the resistor Rb has a lower resistance value as compared to when the liquid-crystal layer 250B does not contain such a cyano-based material. Meanwhile, because, for example, the liquid-crystal layer 250G contains a fluorine-based material, the resistor Rg has a higher resistance value as compared to when the liquid-crystal layer 250G does not contain such a fluorine-based material. In this example, the relationship of the resistance values of the resistors Rb and Rg is Rb<Rg. Likewise, because, for example; the liquid-crystal layer 250G has liquid-crystals with negative anisotropic conductive properties, the capacitor Cg has an electrostatic capacity that is higher as compared to when the liquid-crystal layer 250G does not have liquid-crystals with negative anisotropic conductive properties. Therefore, the relationship of the electrostatic capacities of the capacitors Cb and Cg is Cb<Cg. Note that the stated materials for realizing the relationship of the resistance values of the resistors Rb and Rg and the relationship of the electrostatic capacities of the capacitors Cb and Cg are exemplary, and the materials are not intended to be limited thereto.

Figure 4:
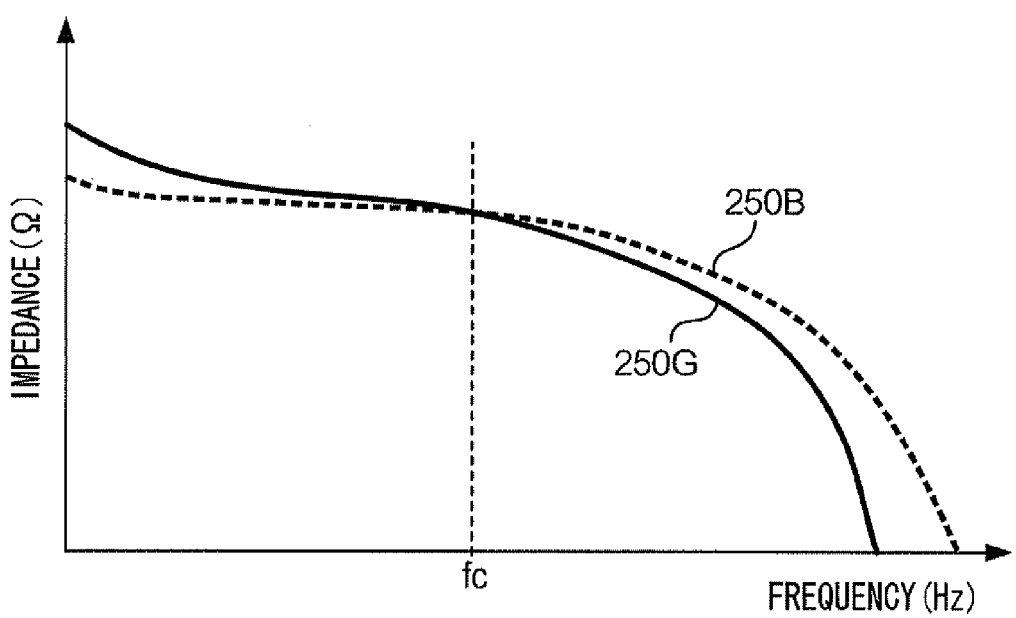
FIG. 4 is a diagram illustrating the frequency-dependence of the impedance of liquid-crystal layers 250B and 250G.

FIG. 4 is a diagram illustrating the frequency-dependence of the impedance of the liquid-crystal layers 250B and 250G. As shown in FIG. 4, the impedance of the liquid-crystal layer 250B is lower than the impedance of the liquid-crystal layer 250G in frequencies lower than a frequency fc, whereas the impedance of the liquid-crystal layer 250B is higher than the impedance of the liquid-crystal layer 250G in frequencies higher than the frequency fc. This is because the frequency-dependence between impedance of the liquid-crystal layer 250B and the impedance of the liquid-crystal layer 250G differs due to differences in the electrostatic capacities of the capacitors Cb and Cg. In other words, this is due to the liquid-crystal layer 250G, whose capacitor Cg has a larger electrostatic capacity, experiencing a greater drop in impedance, due to an increase in the frequency of the applied voltage, than the liquid-crystal layer 250B.

Furthermore, when the values of the voltages applied to each of the liquid-crystal layers 250B, 250G, and 250R (for example, the voltage Vb, in the case of the liquid-crystal layer 250B) reach a pre-set first threshold, the alignments change from their original states (planar or focal conic) to focal conic, and furthermore, when the values of those voltages reach a second threshold, the alignments become homeotropic. The liquid-crystal layers 250B, 250G, and 250R are configured so as to assume planar alignment when the application of the voltage Vb is stopped under these circumstances.

Returning to FIG. 3, as described above, the impedance is frequency-dependent, and thus the ratio of the voltages Vb and Vg of the liquid-crystal layers 250B and 250G, respectively, differs depending on the frequency of the recording voltage applied by the voltage application unit 140. For example, if the frequency of the recording voltage is increased beyond the frequency fc (for example, increased to 50 Hz), the values of the voltages Vb and Vg fulfill the relationship Vb>Vg. However, if the frequency of the recording voltage is decreased beyond the frequency fc (for example, decreased to 1 Hz), the voltages Vb and Vg fulfill the relationship Vb<Vg. Note that in this example, a frequency greater than the frequency fc, or in other words, a recording voltage frequency at which the voltage Vb is greater than the voltage Vg, is called simply a "high frequency", whereas a frequency lower than the frequency fc, or in other words, a recording voltage frequency at which the voltage Vb is less than the voltage Vg, is called simply a "low frequency".

Figure 5:
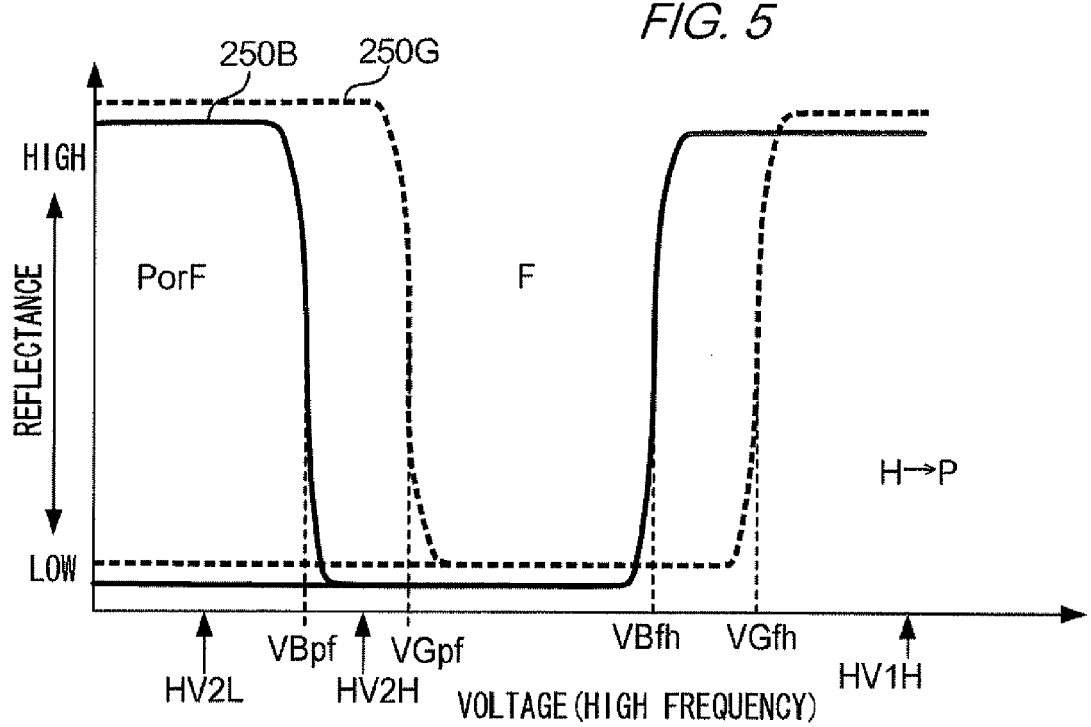
FIG. 5 is a diagram illustrating an example of the reflectance properties of the liquid-crystal layers 250B and 250G during the application of a high-frequency recording voltage.
Figure 6:
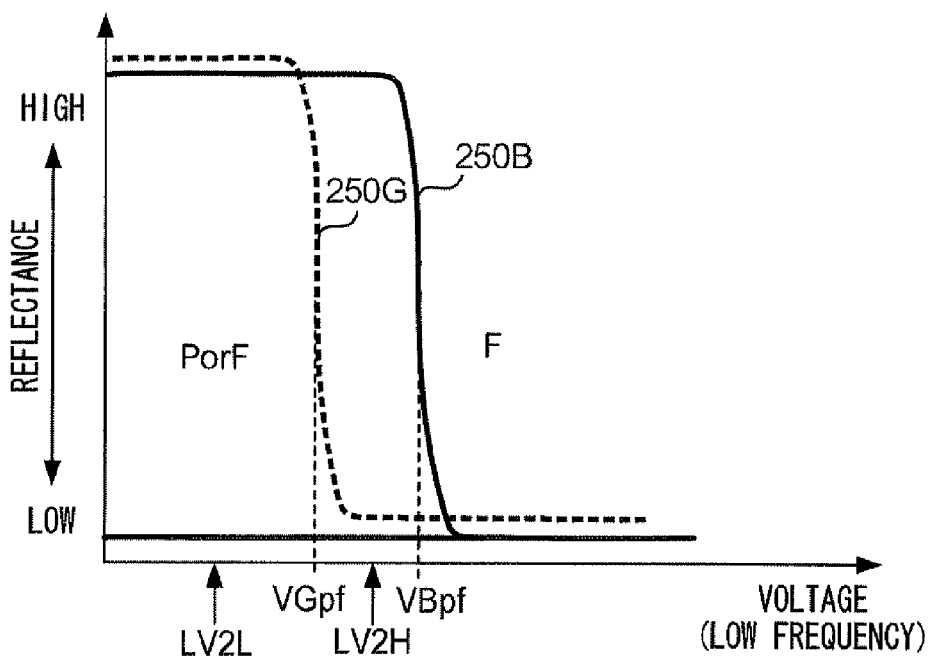
FIG. 6 is a diagram illustrating an example of the reflectance properties of the liquid-crystal layers 250B and 250G during the application of a low-frequency recording voltage.

Next, an example of the control of the liquid-crystal alignments for each pixel in the first display layer 400 and the second display layer 420 shall be described using FIGS. 5, 6, and 7.

FIG. 5 is a diagram illustrating an example of the reflectance properties of the liquid-crystal layers 250B and 250G during the application of a high-frequency recording voltage. FIG. 6, meanwhile, is a diagram illustrating an example of the reflectance properties of the liquid-crystal layers 250B and 250G during the application of a low-frequency recording voltage. The vertical axes in FIGS. 5 and 6 represent the reflectances of the liquid-crystal layers 250B and 250G, respectively, whereas the horizontal axes represent the voltage Vbg (that is, the voltage Vb+the voltage Vg) applied to the multi-layered liquid-crystal phase 300, or in other words, to the liquid-crystal layers 250B and 250G as a whole. FIG. 7 is a diagram illustrating an example of the reflectance properties of the liquid-crystal layer 250R. The vertical axis in FIG. 7 represents the reflectance of the liquid-crystal layer 250R, whereas the horizontal axis represents the voltage applied to the liquid-crystal layer 250R.

As shown in FIG. 5, when the voltage value of the high-frequency voltage Vbg applied to the multi-layered liquid-crystal phase 300 increases and exceeds a threshold VBpf the voltage Vb exceeds the first threshold of the liquid-crystal layer 250B, and the liquid-crystal layer 250B assumes the focal conic alignment. When the value of the voltage Vbg then exceeds a threshold VGpf, the voltage Vg exceeds the first threshold of the liquid-crystal layer 250G, and the liquid-crystal layer 250G also assumes the focal conic alignment. When the voltage Vbg increases further and exceeds a threshold VBfh, the voltage Vb exceeds the second threshold of the liquid-crystal layer 250B, and the liquid-crystal layer 250B assumes the homeotropic alignment. Finally, when the value of the voltage Vbg exceeds a threshold VGfh, the voltage Vg exceeds the second threshold of the liquid-crystal layer 250G, and the liquid-crystal layer 250G also assumes the homeotropic alignment.

As described above, when the high-frequency voltage Vbg is applied to the multi-layered liquid-crystal phase 300, the relationship between the value of the voltage Vb applied to the liquid-crystal layer 250B and the value of the voltage Vg applied to the liquid-crystal layer 250G is Vb>Vg. On the other hand, when the low-frequency voltage Vbg is applied to the multi-layered liquid-crystal phase 300, the relationship between the value of the voltage Vb applied to the liquid-crystal layer 250B and the value of the voltage Vg applied to the liquid-crystal layer 250G is Vb<Vg. Thus the manner in which the voltage is divided between the liquid-crystal layer 250B and the liquid-crystal layer 250G changes when the frequency of the applied voltage is changed, and thus the values of the voltages Vb and Vg change even if the value of the voltage Vbg does not change. Therefore, the thresholds applied to the voltage Vbg (VBpf and VGpf) change even if the first and second thresholds applied to the liquid-crystal layers 250B and 250G do not change.

For this reason, when the voltage Vbg applied to the multi-layered liquid-crystal phase 300 is low-frequency, the size relationship between the thresholds for the voltage Vbg (VBpf, VGpf) differs, as shown in FIG. 6, from that stated above. In other words, when the voltage value of the low-frequency voltage Vbg applied to the multi-layered liquid-crystal phase 300 increases and exceeds the threshold VGpf, the liquid-crystal layer 250G assumes the focal conic alignment, and when the voltage value exceeds the threshold VBpf, the liquid-crystal layer 250B also assumes the focal conic alignment.

With respect to the liquid-crystal layer 250R, when, as shown in FIG. 7, the voltage value of the voltage applied to the liquid-crystal layer 250R increases and exceeds the threshold VRpf, the liquid-crystal layer 250R assumes the focal conic alignment. When that voltage value further increases and exceeds a threshold VRfh, the liquid-crystal layer 250R assumes the homeotropic alignment. When the application of the voltage is stopped while in the homeotropic alignment, the homeotropic alignment changes to the planar alignment, and the liquid-crystal layer 250R is maintained and stabilized in the planar alignment. This ends the descriptions of the configuration of the electronic paper 200.

Next, operations performed by the recording device 100 for recording an image onto the electronic paper 200 shall be described using FIGS. 5, 6, and 7. The recording device 100 holds the electronic paper 200, and when an image has been instructed to be recorded through the operation of the operation unit 120 or the like, the control unit 110 acquires image information representing a color image, and commences a process for recording the image onto the electronic paper 200.

First, the recording of the red component of the image shall be described using FIG. 7. The recording of the red component of the image is carried out by controlling the second display layer 420. When the control unit 110 controls the voltage application unit 140 so as to apply a recording voltage V3 between the transparent electrodes 222 and 262, that voltage V3 is divided between the photoconductive layer 232 and the liquid-crystal layer 250R, resulting in a voltage of a voltage value V3L being applied to the liquid-crystal layer 250R.

The control unit 110 then causes the light irradiation unit 130 to irradiate a red recording light based on red component information contained in the image information, whereupon the resistance of the photoconductive layer 232 drops, and the voltage value of the voltage divided and applied to the liquid-crystal layer 250R increases. The recording light is irradiated from the side of the film substrate 210. However, the light irradiation unit 130 may be configured so as to irradiate the recording light from the side of the film substrate 270.

As a result, the voltage applied to the regions of the liquid-crystal layer 250R that have been irradiated with the recording light increases to a voltage value V3H. When the application of the recording voltage V3 is then stopped, the portions of the liquid-crystal layer 250R that have been irradiated with the recording light assume the planar alignment, thus taking on a state in which red light is selectively reflected, whereas the portions not irradiated with the recording light assume the focal conic alignment. Note that a reset process for, for example, erasing an image already recorded may be carried out prior to the stated image recording.

Here, the photoconductive layer 230 allows red light to pass. Therefore, of the light that enters from the side of the film substrate 270, the red light reaches the liquid-crystal layer 250R; the red light that is reflected off of the portions of the liquid-crystal layer 250R that are in the planar alignment is once again emitted from the film substrate 270. However, the red light that passes through the portions of the liquid-crystal layer 250R that are in the focal conic alignment is absorbed by the photoconductive layer 232. Note that when the absorptivity of the photoconductive layer 232 for red light is too low an absorptivity to show blacks, a light-absorbing layer that absorbs red light may be provided as a layer that does not obstruct the recording light from entering into the photoconductive layer 232, and thus provided, for example, between the photoconductive layer 232 and the liquid-crystal layer 250R when the configuration is such that the recording light enters from the side of the film substrate 270.

Next, the recording of the blue and green components of the image is carried out by controlling the first display layer 400. In the following descriptions, the planar alignment is indicated by "P" and the focal conic alignment is indicated by "F", and the relationship of alignments between the liquid-crystal layers 250B and 250G is represented by, for example, (P, P). Here, there are four combinations of alignments between the liquid-crystal layers 250B and 250G, or (P, P), (P, F), (F, P), and (F, F). Control performed for assuming these liquid-crystal alignments shall now be described.

First, the recording of the blue component of the image shall be described using FIG. 5. When the control unit 110 controls the voltage application unit 140 so as to apply a high-frequency recording voltage V1 between the transparent electrodes 220 and 260, that voltage V1 is divided between the photoconductive layer 230 and the multi-layered liquid-crystal phase 300, and thus the voltage Vbg applied to the multi-layered liquid-crystal phase 300 takes on a voltage value HV1H (VBfh, VGfh<HV1H). In this state, the liquid-crystal layers 250B and 250G each assume the homeotropic alignment.

When the application of the recording voltage V1 is then stopped, the alignment of the liquid-crystal layers 250B and 250G changes from the homeotropic alignment to the planar alignment, and those alignments (P, P) are maintained. Note that during these operations, the value of the voltage Vbg may be caused to increase to the voltage value HV1H by causing the light irradiation unit 130 to irradiate the recording light, in turn causing the resistance value of the photoconductive layer 230 to drop and the ratio of the voltage divided and applied to the multi-layered liquid-crystal phase 300 to increase. Note also that these operations may be carried out with the frequency of the recording voltage V1 being a low frequency, but using a high frequency decreases the influence of impure ions, moisture, and so on within the liquid-crystal layers 250B and 250G, thereby providing a higher reflectance in the planar alignment. Furthermore, the frequency of the recording voltage V1 may be higher than the frequency of a recording voltage HV2, which shall be described later.

Next, the control unit 110 controls the voltage application unit 140 so as to apply a high-frequency recording voltage HV2 between the transparent electrodes 220 and 260. The applied recording voltage HV2 is divided between the photoconductive layer 230 and the multi-layered liquid-crystal phase 300, and the voltage Vbg applied to the multi-layered liquid-crystal phase 300 has a value of HV2L (HV2L<VBpf, VGpf). In this state, the liquid-crystal layer 250B and 250G maintain alignments of (P, P).

Next, the control unit 110 causes the light irradiation unit 130 to irradiate a blue recording light (green is also acceptable) based on blue component information contained in the image information. This irradiation causes the resistance of the photoconductive layer 230 to drop, and thus the ratio of the voltage that is divided and applied to the multi-layered liquid-crystal phase 300 increases. The recording light is irradiated from the side of the film substrate 270. However, the light irradiation unit 130 may be configured so as to irradiate the recording light from the side of the film substrate 210.

As a result, the voltage Vbg applied to the regions of the multi-layered liquid-crystal phase 300 that have been irradiated with the recording light increases to a voltage value HV2H (VBpf<HV2H<VGpf), and the portions of the liquid-crystal layer 250B that have been irradiated with the recording light assume the focal conic alignment. In other words, the alignments of the liquid-crystal layer 250B and 250G are (P, P) in portions not irradiated by the recording light and (F, P) in portions irradiated by the recording light. These alignments are maintained even if the application of the recording voltage HV2 is then stopped.

Next, the recording of the green component of the image shall be described using FIG. 6. The control unit 110 controls the voltage application unit 140 so as to apply a low-frequency recording voltage LV2 between the transparent electrodes 220 and 260. The applied recording voltage LV2 is divided between the photoconductive layer 230 and the multi-layered liquid-crystal phase 300, and the voltage Vbg applied to the multi-layered liquid-crystal phase 300 has a value of LV2L (LV2L<VGpf, VBpf). In this state, the alignments of the liquid-crystal layers 250B and 250G each maintain one of the stated alignments (that is, (P, P) or (F, P)).

The control unit 110 then causes the light irradiation unit 130 to irradiate a blue recording light (green is also acceptable) based on green component information contained in the image information. This irradiation causes the resistance of the photoconductive layer 230 to drop, and thus the ratio of the voltage that is divided and applied to the multi-layered liquid-crystal phase 300 increases. The recording light is irradiated from the side of the film substrate 270. However, the light irradiation unit 130 may be configured so as to irradiate the recording light from the side of the film substrate 210.

As a result, the voltage Vbg applied to the regions of the multi-layered liquid-crystal phase 300 that have been irradiated with the recording light increases to a voltage value LV2H (VGpf<LV2H<VBpf). The portions of the liquid-crystal layer 250G that have been irradiated with the recording light thus assume the focal conic alignment. In other words, of the portions whose alignments were (F, P), the portions that have been irradiated with the recording light assume alignments of (F, F), whereas of the portions whose alignments were (P, P), the portions that have been irradiated with the recording light assume alignments of (P, F). However, portions that have not been irradiated with the recording light return to their original alignments ((P, P) or (F, P)). These alignments are maintained even if the application of the recording voltage LV2 is then stopped.

FIG. 8 is a diagram illustrating change in the liquid-crystal alignments of the liquid-crystal layers 250B and 250G. By performing the abovementioned processing, as shown in FIG. 8, the control unit 110 controls the light irradiation unit 130 and the voltage application unit 140 based on the blue and green components of the image information, and selects a combination of alignments, or (P, P), (P, F), (F, P), or (F, F), for the liquid-crystal layers 250B and 250G, depending on the presence/absence of recording light irradiation during the application of the high-frequency recording voltage HV2 and the presence/absence of recording light irradiation during the application of the low-frequency recording voltage LV2.

Here, of the external light that enters from the side of the film substrate 270, light that is not reflected and instead passes through the liquid-crystal layers 250B and 250G is absorbed by the photoconductive layer 230 in the case of blue and green light, and is reflected by the liquid-crystal layer 250R but absorbed by the photoconductive layer 232 in the case of red light, as described above. Note that when the absorptivity of the photoconductive layer 230 for blue and green light is too low an absorptivity to show blacks, a light-absorbing layer that absorbs blue and green light may be provided as a layer that does not obstruct the recording light from entering into the photoconductive layer 230, and thus provided, for example, between the photoconductive layer 230 and the liquid-crystal layer 250G when the configuration is such that the recording light enters from the side of the film substrate 270.

Through this, the portions in which all the liquid-crystal layers 250B, 250G, and 250R are in the focal conic alignment appear black from the side of the film substrate 270. Furthermore, portions where the liquid-crystal layer 250R is in the planar alignment appear white when the liquid-crystal layers 250B and 250G are in the (P, P) alignment, magenta when the liquid-crystal layers 250B and 250G are in the (P, F) alignment, yellow when the liquid-crystal layers 250B and 250G are in the (F, P) alignment, and red when the liquid-crystal layers 250B and 250G are in the (F, F) alignment; portions where the liquid-crystal layer 250R is in the focal conic alignment appear cyan when the liquid-crystal layers 250B and 250G are in the (P, P) alignment, blue when the liquid-crystal layers 250B and 250G are in the (P, F) alignment, and green when the liquid-crystal layers 250B and 250G are in the (F, P) alignment.

Note that although the control for image recording described above is, in this example, performed in order from the red component, to the blue component, and then to the green component, the order is not limited thereto, and any order may be used.

In this manner, when the electronic paper 200, which is the optical-recording type display medium according to an exemplary embodiment of the present invention, is used, the recording device 100 records a color image by changing the frequency of the recording voltage.

2. Variations

Although an exemplary embodiment of the present invention was described above, several variations on the present invention are also possible, and shall be described hereinafter.

2-1. Variation 1

In the above exemplary embodiment, the relationships between the resistance values of the resistors Rb and Rg and the electrostatic capacities of the capacitors Cb and Cg in the multi-layered liquid-crystal phase 300 are Rb<Rg and Cb<Cg. However, these may be reversed according to the relationships between the liquid-crystal layer 250B and the liquid-crystal layer 250G, and thus may be Rb>Rg and Cb>Cg.

2-2. Variation 2

In the above exemplary embodiment, the relationships between the resistance values of the resistors Rb and Rg and the electrostatic capacities of the capacitors Cb and Cg are Rb<Rg and Cb<Cg. However, the configuration may be such that the resistance value of at least one of the resistors Rb and Rg may be frequency-dependent, resulting in the resistance value of the resistor Rb increasing compared to the resistance value of the resistor Rg when the frequency increases which in turn causes a greater increase in the difference between the impedance of the liquid-crystal layer 250B and the impedance of the liquid-crystal layer 250G at high frequencies. For example, the configuration may be such that Rb<Rg and Cb<Cg at low frequencies, whereas Rb>Rg and Cb>Cg at high frequencies.

2-3. Variation 3

In the above exemplary embodiment, the configuration is such that the size relationship of the impedance of the liquid-crystal layer 250B and the impedance of the liquid-crystal layer 250G reverse depending on whether the frequency of the applied voltage is higher or lower than the frequency fc. However, the relationship does not necessarily have to reverse, and any relationship is acceptable as long as the frequency-dependence of the impedances differ. The ratio of the voltage Vb applied to the liquid-crystal layer 250B and the voltage Vg applied to the liquid-crystal layer 250G may be made to change depending on the frequency of the recording voltage that is applied, resulting in, as shown in FIGS. 5 and 6, the size relationship of the thresholds VBpf and VGpf for the voltage Vbg reversing depending on the frequency of the applied recording voltage.

In other words, the configuration may be such that when a recording voltage of a certain first frequency is applied, and the voltage Vbg applied to the multi-layered liquid-crystal phase 300 is of a pre-set voltage value, the value of the voltage Vb divided and applied to the liquid-crystal layer 250B is greater than or equal to the first threshold of the liquid-crystal layer 250B, whereas the value of the voltage Vg divided and applied to the liquid-crystal layer 250G is less than the first threshold of the liquid-crystal layer 250G; and when a recording voltage of a certain second frequency, which is less that the first frequency, is applied, and the voltage Vbg is of a pre-set voltage value, the value of the voltage Vb is less than the first threshold of the liquid-crystal layer 250B, and the value of the voltage Vg is greater than or equal to the first threshold of the liquid-crystal layer 250G. Therefore, the liquid-crystal layers 250B and 250G may each be configured so as to have first thresholds and impedance frequency-dependence set so as to realize those conditions.

2-4. Variation 4

In the above exemplary embodiment, the liquid-crystal layers 250B, 250G, and 250R are configured so that they each reflect different colors when in the planar alignment, and reflect light of different wavelength distributions. However, rather than having different reflected light/colors, the tone may be controlled by controlling the reflections and passage of light of the multiple liquid-crystal layers.

2-5. Variation 5

In the above exemplary embodiment, an image is formed by irradiating light. However, images may be recorded using a different configuration. For example, the configuration may be such that the transparent electrodes 220, 222, 260, and 262 are divided, and the recording voltages applied to each of the divided transparent electrodes can be controlled individually. In this manner, the voltage values and frequencies of the recording voltages applied to each of the transparent electrodes obtained through the division may be individually controlled, thereby changing the alignments of the liquid-crystal layers between each transparent electrode and recording an image. In this case, the photoconductive layers 230 and 232 are unnecessary 2-6. Variation 6

In the above exemplary embodiment, the first display layer 400 has two layers, or the liquid-crystal layers 250B and 250G. However, the first display layer 400 may instead have only one of those layers, or a liquid-crystal layer that reflects different colors than those layers. Conversely, in the above exemplary embodiment, the second display layer 420 has one layer, or the liquid-crystal layer 250R; however, another liquid-crystal layer that reflects a different color may be layered thereupon. In this case, the color that passes through the photoconductive layer 230 may be used as the color that is reflected by the liquid-crystal layer in the second display layer 420.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording device comprising:
   an obtainment unit that obtains image information representing an image; and
   a voltage application unit that applies a voltage with a frequency according to the image information obtained by the obtainment unit, to a pair of electrodes equipped with a display medium, the display medium having a multi-layered liquid-crystal phase provided between the pair of electrodes, the multi-layered liquid-crystal phase having a first layer capable of assuming a specific alignment when the applied voltage is greater than or equal to a pre-set first voltage threshold, and a second layer capable of assuming a specific alignment when the applied voltage is greater than or equal to a second voltage threshold, wherein:
   an application of a voltage to the pair of electrodes effecting a first voltage component and a second voltage component applied to the first layer and the second layer, respectively;
   when the voltage applied to the pair of electrodes is of a first frequency and is a pre-set voltage value, the first voltage component becomes greater than or equal to the first voltage threshold, and the second voltage component becomes less than the second voltage threshold; and
   when the voltage applied to the pair of electrodes is of a second frequency that is lower than the first frequency and is a pre-set voltage value, the first voltage component becomes less than the first voltage threshold, and the second voltage component becomes greater than or equal to the second voltage threshold.

2. The recording device according to claim 1, wherein the impedance of the first layer is greater than the impedance of the second layer at the first frequency and less than the impedance of the second layer at the second frequency.

3. The recording device according to claim 1, further comprising
   a light irradiation unit that, when a voltage is applied by the voltage application unit, irradiates the display medium with light based on the image information obtained by the obtainment unit,
   wherein the display medium further has a photosensitive layer provided between the pair of electrodes, the photosensitive layer being provided on the multi-layered liquid-crystal phase, and a resistance value of which drops when irradiated with light;
   an application of a voltage to the pair of electrodes effecting the first voltage component, the second voltage component, and a third voltage component applied to the first layer, the second layer, and the photosensitive layer, respectively;
   when the voltage applied to the pair of electrodes is of a first frequency and is a pre-set voltage value, the first voltage component becomes less than the first voltage threshold, and the second voltage component becomes less than the second voltage threshold, and when the photosensitive layer is irradiated with light, the first voltage component becomes greater than or equal to the first voltage threshold, and the second voltage component becomes less than the second voltage threshold; and
   when the voltage applied to the pair of electrodes is of a second frequency and is a pre-set voltage value, the first voltage component becomes less than the first voltage threshold, and the second voltage component becomes less than the second voltage threshold, and when the photosensitive layer is irradiated with light, the first voltage component becomes less than the first voltage threshold, and the second voltage component becomes greater than or equal to the second voltage threshold.

4. The recording device according to claim 1, wherein the first layer and the second layer reflect wavelength distributions of light that are different from one another when in an alignment that is different from the specific alignment.

5. The recording device according to claim 1, wherein the voltage application unit applies a voltage of a frequency greater than or equal to the first frequency when the first layer and the second layer are in an alignment that is different from the specific alignment.

* * * * *